United States Patent [19]

Hasegawa et al.

[11] Patent Number: 5,091,856

[45] Date of Patent: Feb. 25, 1992

[54] CONTROL APPARATUS FOR AUTOMOBILES

[75] Inventors: Taiji Hasegawa, Nakaminato; Masaaki Fujisawa, Mito; Masahide Sakamoto, Katsuta; Toshio Ishii, Mito; Hideharu Takahashi, Hitachi, all of Japan

[73] Assignee: Hitachi, Ltd., Tokyo, Japan

[21] Appl. No.: 507,466

[22] Filed: Apr. 11, 1990

[30] Foreign Application Priority Data

Apr. 14, 1989 [JP] Japan ................................. 1-92863

[51] Int. Cl.⁵ ............................................. G06F 15/20
[52] U.S. Cl. .................................. 364/424.05; 180/287; 235/382
[58] Field of Search ................. 364/424.01, 424.05; 180/287; 235/375, 380, 382, 382.5, 384; 340/825.31, 825.34

[56] References Cited

U.S. PATENT DOCUMENTS

| | | | |
|---|---|---|---|
| 4,204,255 | 5/1980 | Cremer | 364/424.05 |
| 4,451,887 | 5/1984 | Harada et al. | 364/424.05 |
| 4,706,194 | 11/1987 | Web et al. | 364/424.05 |
| 4,707,788 | 11/1987 | Tashiro et al. | 364/424.05 |
| 4,731,769 | 3/1988 | Schaefer et al. | 369/6 |
| 4,982,072 | 1/1991 | Takigami | 235/384 |

*Primary Examiner*—Thomas G. Black
*Attorney, Agent, or Firm*—Antonelli, Terry, Stout & Kraus

[57] ABSTRACT

A control apparatus for an automobile is provided with a system manager, which initiates and manages the operation of units for controlling and operating various devices and accessories installed in the automobile. The system manager is coupled with a card unit, in which a card is inserted. Such a card has an identification code ID of a user and a code indicating that the card is registered in advance. The system manager has a list of codes of cards registered. If a card inserted is confirmed to be correct and valid by the ID and the registration code, the system manager executes a predetermined processing operation and produces a set-up instruction signal. Upon receipt of this set-up instruction signal, operations of the control units for the devices and accessories are initiated.

24 Claims, 9 Drawing Sheets

```
              MENU

1   ENGINE CONTRL UNIT 1. economic   2. normal    3. sporty

2   POWER STEERING UNIT 1. normal    2. sporty    3. not use

5   AIR CONDITIONER 1. use        2. not use   3. change

6   CAR RADIO 1. use        2. not use   3. change push a chg./reg. button, if OK.
```

CONTROL APPARATUS FOR AUTOMOBILES

BACKGROUND OF THE INVENTION

1. Field of the invention

The present invention relates to a control apparatus, which is capable of realizing the improved and advanced utilization of automobiles.

2. Description of the related art

In a conventional automobile, there is provided a key switch in a driver's seat. Various devices equipped in an automobile including power train control units, such as an engine starter, a fuel control device, a transmission control device and so on, and accessory control units, such as an air-conditioner, a power-driven window device, a car radio set, etc., are supplied with electric power to be initiated or brought into condition for initiation by turning on the key switch using a key.

If, therefore, several persons use an automobile in common, there is the case where the same number of keys as that of joint users are needed. If plural persons use plural automobiles, the management of keys of those automobiles will become much more troublesome. In such a case, there exists a further problem that the drive or travel characteristics of an automobile may not be always suited for preference of every joint user.

The related art is disclosed, for example, in published Japanese patent applications JP-A-62-273649 (1987), JP-A-63-26138 (1988) and JP-A-63-223901 (1988), and JP-A-60-90947 (1985). Although the inventions thereof have no direct relation with the present invention, their disclosure suggests the background of the invention and may be available for understanding an embodiment of the invention.

SUMMARY OF THE INVENTION

An object of the present invention is to provide a control apparatus for an automobile, by which various devices and accessories installed in the automobile can be initiated or brought into the condition of initiation by a portable recording medium, such as a magnetic card, without a conventional key.

A feature of the present invention resides in that a control apparatus is provided with a system manager, for initiating and managing the operation of units for controlling and operating various devices and accessories installed in the automobile, which is coupled with an information read/write unit, in which a recording medium recorded therein with a certain information is inserted, whereby if a recording medium inserted is confirmed to be valid and correct, the system manager executes a predetermined processing operation and produces a set-up instruction signal for initiating, or bringing into the condition of initiation, the devices and accessories.

DESCRIPTION OF THE PREFERRED EMBODIMENTS

Figure 1:
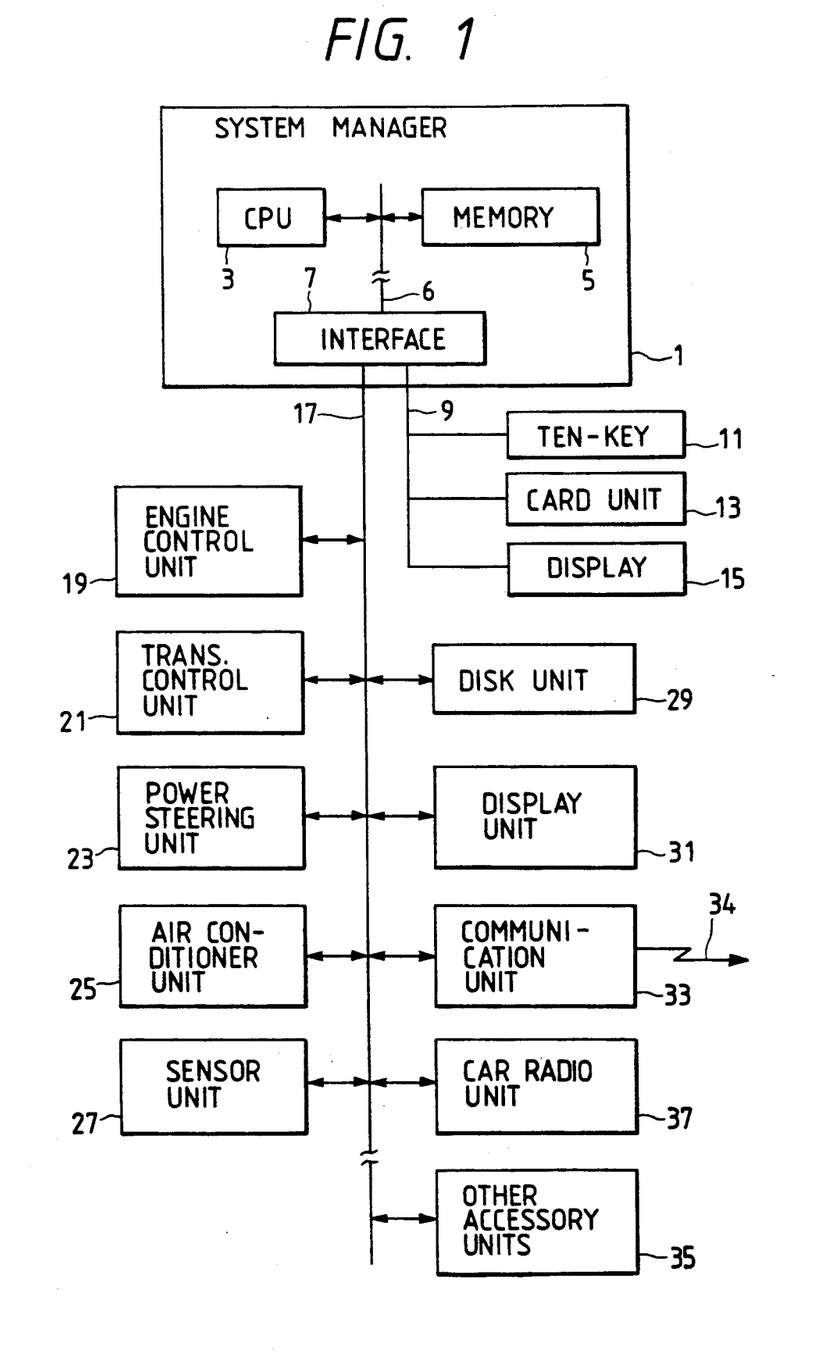
FIG. 1 is a block diagram schematically showing a control apparatus for an automobile according to an embodiment of the present invention.

Referring at first to FIG. 1, there is shown a block diagram of a control apparatus for an automobile according to an embodiment of the present invention.

In the figure, reference numeral 1 denotes a system manager, which is a main part of the control apparatus of the embodiment and constructed by a well known microprocessor. Namely, the system manager 1 comprises central processing unit (CPU) 3 and internal memory 5 which are coupled by internal bus line 6 so as to communicate data with each other. The internal bus 6 is coupled with interface 7. To the interface 7, there is further coupled ten-key device 11, card unit 13 and display device 15 through line 9.

The ten-key device 7 is a usual one capable of inputting numerical data. The card unit 13 can read data recorded on a card inserted therein by a user who is going to drive the automobile, and write data supplied from the system manager 1 in the card. The data to be recorded on the card includes at least a code (ID) for identifying a user and information indicating that the card is registered in advance.

Further information, which is preferable to be recorded in the card, will be described later. Preferably, the data and information are recorded in the card magnetically, however other known types of recording media, such as a so-called IC card, can be substituted therefor.

The display device 15 is employed to display various guidances or messages issued by the system manager 1 to a user. A user carries out the necessary manipulation in accordance with the guidances or messages, whereby a desired system for an automobile control and accessories can be made up dialogically. This display 15 will be called a system display, compared with another display unit which will be referred to later and used for displaying various instruments.

The interface 7 is further coupled to external bus line 17, to which various device control units and accessory units are coupled. As shown in FIG. 1, such units include engine control unit 19, transmission control unit 21, power-driven steering unit 23, air conditioner unit 25, sensor unit 27, disk unit 29, display unit 31, communication units 33, and other various accessory unit 35 as well as, for example, car radio unit 37.

There can be various types of such units as mentioned above. As a first type, each unit may have microprocessor including its private memory always storing a program and data necessary for execution of the program. The unit can achieve its own function autonomously by executing the program, but under the management of the system manager 1. For a unit of this type, there can be employed a device already known, such as an engine control device, an automatic transmission control device, etc.

In another type of unit, a private memory of a microprocessor does not always store a program to be executed by the microprocessor, but the program is loaded in the private memory by the system manager 1 at the time it is required. After a program has been once loaded in a private memory of a unit of this type, the unit functions just like the first type of unit. Since the size of presently existing programs for an automobile is, as a whole, at largest 30 to 40K Bytes, the memory 5 of the system manager 1 can store all of those programs sufficiently.

A further type of a unit has no microprocessor. In this type, the system manager 1 stores all of necessary programs in its memory 5 and executes them to produce instructions to the units, and each unit actuates and controls its control subject in response to an instruction supplied thereto by the system manager 1.

The present invention can be applied to every type of unit as mentioned above. In this embodiment, however, it is assumed that the units are of the first type as mentioned above. Therefore, each unit includes a microprocessor and necessary peripheral devices so that it can achieve its own function autonomously under the management of the system manager 1.

As already described, a detailed structure and architecture of such a unit is already known and therefore further description thereof is omitted here. In the following, some of the units as shown in FIG. 1 will be briefly described with respect to only points concerning the present invention. Further, the operating statuses of the units described hereinbelow and their relation with the operating status of the system manager 1 will be explained in detail later, referring to FIGS. 11a to 11d showing the status transfer of the operation of the respective units.

At first, the engine control unit 19 has a microprocessor with its private memory storing a program known in itself for engine control, and achieves various engine control functions, such as a fuel injection control, an ignition timing control and so on, by executing the stored program. In the operation of this unit 19, a response characteristic against an acceleration pedal depression amount and a so-called acceleration correction coefficient in the fuel injection or ignition timing control can be changed by selecting corresponding constants stored in the memory. Thereby, a user can choose the drive characteristic of his automobile from among an economic drive, normal drive, sporty drive, etc., for example.

The transmission control unit 21 comprises almost the same components as the unit 19, but a program stored in an private memory of a microprocessor of this unit 21 is of course different therefrom. This unit 21 operates in cooperation with the unit 19 and carries out gear shift operations in accordance with the stored program, every time the automobile speed or the rotational speed of the engine reaches a predetermined value provided in advance. Similarly to the case of the unit 19, if the above predetermined value is changed, a user can choose the drive characteristic of his automobile from among "economic", "normal", "sporty", etc.

In the power steering unit 23, a user can select a factor determining the steering characteristic, e.g., light steering (but dull response) or heavy steering (but sharp response), which is equivalent to a gear ratio in a usual, non-powered steering device. This is done by changing a corresponding constant stored in a private memory of a microprocessor of this unit 23. The air conditioner unit 25 controls a room temperature of an automobile and a blower of an air conditioner in accordance with a program stored in a private memory of a microprocessor of this unit 25 on the basis of a temperature and an air capacity set by the ten-key device 11 through the system manager 1.

The disk unit 29 is a known unit, which can write and read an information in or from a floppy disk. Such a floppy disk can carry programs necessary for the various controls of an automobile. Therefore, a new program for the engine control, for example, can be supplied to a private memory of the engine control unit 19 from this unit 29 through the system manager 1. With this, an input version of a program for the engine control can be easily coped with.

The display unit 31 selects necessary instruments from among, for example, a speed meter, a tachometer, a fuel gauge, a cooling water temperature meter, an engine oil pressure gauge, charging voltage and current meters, a clock, etc., in accordance with a user's request, and displays them in its display screen. The sensor unit 27 will cooperate with this unit 31.

The communication unit 33 carries out the data transfer between the units. In addition, as shown by arrow line 34, it can communicate data by radio with external facilities such as a repair service station and a navigation service center, under the management of the system manager 1. For example, the function of a whole system of the control apparatus can be diagnosed by receiving a signal for diagnosis from a repair service station. Also, a user can be guided to his desired location by receiving guidance from a navigation service center.

Further, the control apparatus shown includes units 35 for other accessories, such as the car radio unit 37. The car radio unit 37 carries out the tuning and the adjustment of the sound volume in response to an instruction given by a user through the system manager 1. Similarly, other accessory units 35 control corresponding accessories under the management of the system manager 1.

It is to be noted here that the units as shown in FIG. 1 and described above are by way of example only. Some of those units may be omitted and/or some others may be added. For example, if an automobile has no automatic transmission, the transmission control unit 21 will be unnecessary. In the case of an automobile with a nonpowered steering device, the power steering unit 23 is not needed. If an automobile is equipped with a power window device, the other accessory units 35 must include a power window control unit.

Further, it should be noted that, according to the present invention, all of units originally installed in an automobile may not be made operable, i.e., only necessary ones thereof can be made operable selectively. As will be apparent later, only units which are registered in a registration area of the memory 5 of the system manager 1 will be made operable. It is of course that this registration can be changed at an appropriate time point.

Figure 2:
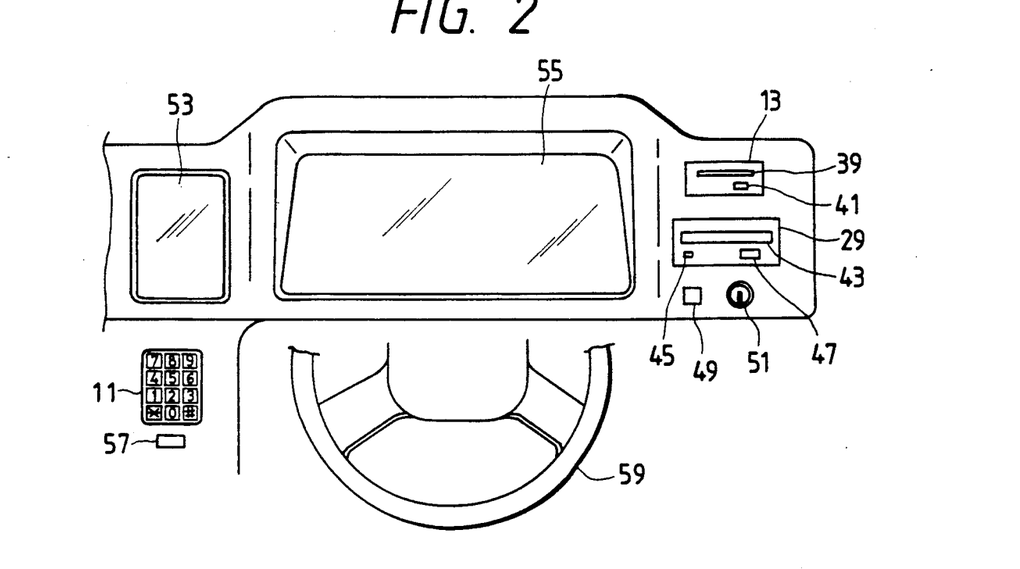
FIG. 2 shows an example of an arrangement of various devices or instruments in a driver's seat of an automobile to which the present invention is applied.

Referring next to FIG. 2, there is shown an example of an arrangement of various devices and instruments at the driver's seat. In the figure, the same parts are denoted by the same reference numerals as in FIG. 1.

As shown in FIG. 2, the card unit 13 has slit 39, through which a card is inserted, and eject button 41 for ejecting a card inserted. As will be apparent later, when the eject button 41 is pushed, an interruption signal to the system manager 1 is produced, and a card is ejected.

The disk unit 29 has opening 43, through which a floppy disk is inserted, indicator 45 turned on during the operation of the disk unit 29, and eject button 47 for ejecting a floppy disk inserted therein.

There is provided button switch 49 for a starter motor (not shown), which, when pushed, activates the starter motor to start the cranking of an engine. A key switch 51 is a conventional key switch, which is provided as back-up. Therefore, an engine of an automobile according to this embodiment can be started either by inserting a card in the card unit 13 or by manipulating the key switch 51 by a key.

Reference numerals 53 and 55 denote display screens of the system display device 15 and the display unit 31, respectively. Push button switch 57 is a change/register switch, which is, although described in detail later, pushed down when a user wants to change units to be used and their specifications and register them. Reference numeral 59 denotes a steering wheel.

Figure 3:
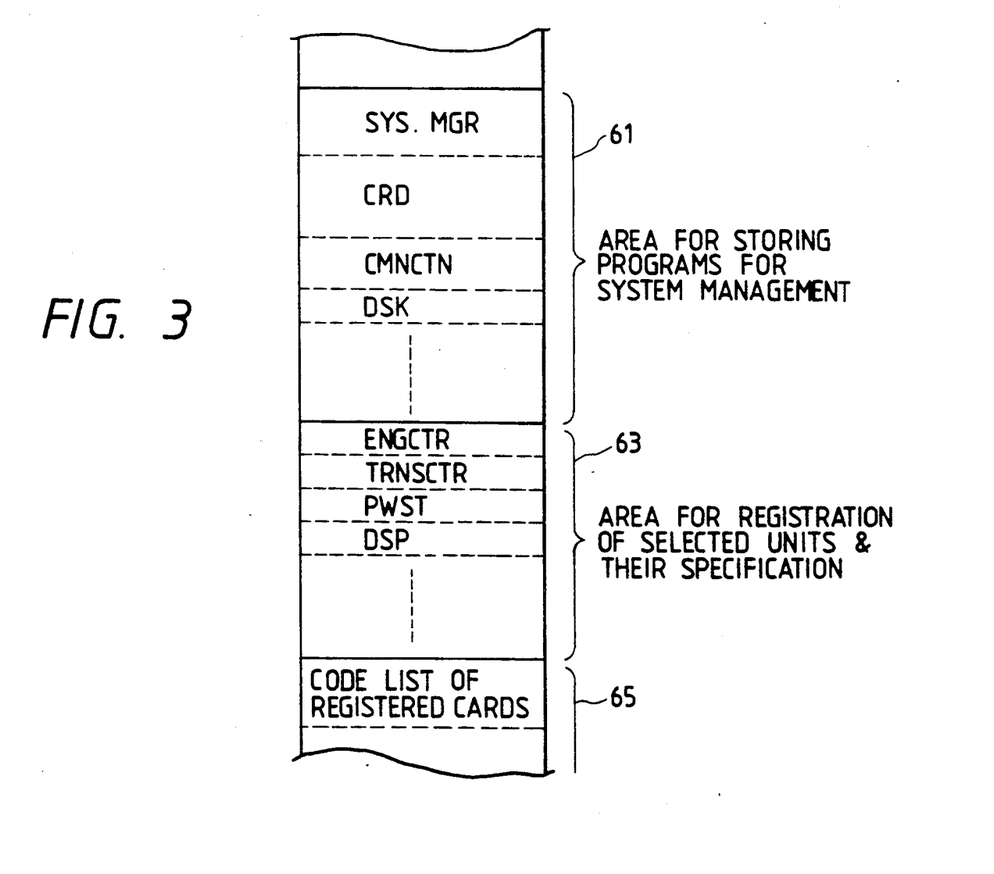
FIG. 3 shows an example of an allotment of storage areas in an internal memory of a system manager included in the control apparatus of FIG. 1.

FIG. 3 shows an example of the allocation of storage in the memory 5 of the system manager 1. The storage area shown is divided into three areas 61, 63, 65. In the area 61, there are stored programs relating to the management of a whole system of a control apparatus. In this figure, there are shown four programs as an example; i.e., SYS.MGR, CRD, CMNCTN and DSK. The SYS.MGR is a program executed by the system manager 1 to manage the whole system. This program will be described in detail later, with reference to various flow charts.

The CRD, CMNCTN and DSK are programs for the card unit 13, the communication unit 33 and the disk unit 29, respectively. In this embodiment, these programs are made to be started at the earlier stage of the processing operation of the SYS.MGR, and therefore are stored in this area 61. However, the kinds of programs stored in this area greatly depend on the objectives of the system management. Further, since the contents themselves of the CRD, CMNCTN and DSK, i.e., the processing operations of the card unit 13, the communication unit 33 and the disk unit 29, have nothing to do with the essence of the present invention, the detailed description thereof will be omitted.

The area 63 of the memory 5 is an area for the registration of selected units and their specifications. In the example shown, EGNCTR, TRNSCTR, PWST and DSP are names of programs for the engine control unit 19, the transmission control unit 21, the power steering unit 23 and the display unit 31 and mean that those units are registered. Although not shown in the figure, each subarea, in which an individual unit is registered, further includes record parts, in which codes or flags are written. As will be apparent from the operation described later, such codes or flags indicate whether a corresponding unit is to be used or not used and the required specifications of the unit.

The area 65 is an area for storing optional data or programs necessary for the system management or the control for an engine or accessories. In the figure, there is shown an example that a list of codes of registered cards is stored. This is because it is assumed in the embodiment that plural users have their own cards and commonly use one or more automobiles. In this case, rightful users' cards are necessary to be registered in control apparatus for those automobiles in advance, in order to prevent theft, misuse, etc., for example.

Referring next to the flow charts of FIGS. 4a and 4b, the processing operation of the system manager 1 will be explained. Further, in these flow charts, steps illustrated by a chain line indicate steps of the manipulation carried out by a user.

When a user inserts his card into the card unit 13, the system manager 1 is powered on and the processing operation of these figures starts. After start, the program CRD for the card unit 13, which is stored in the area 61 of the memory 5, is started (step 71) and then it is checked whether or not the inserted card is registered and valid (step 72).

If it is judged at step 72 that the inserted card is not registered or valid, a guidance is displayed in the system display device 15 (step 73), and the processing operation ends. An example of this guidance is "Invalid card. Retry with a valid card, or start with a key." At step 72, if it is judged that the inserted card is registered and valid, a guidance such as "Input your identification (ID)" is displayed in the display device 15 (step 74).

The inputted ID is checked at step 75, and if it is judged that the ID is incorrect, a guidance is displayed in the system display device 15 (step 76), and the processing operation ends. An example of this guidance is "Incorrect ID. Retry to input your ID, or start with a key." At step 75, if it is judged that the inputted ID is correct, the program CMNCTN for the communication unit 33 is started (step 77).

The processing operation until this stage will be explained further in detail later, referring to FIG. 5. Therefore, the further description thereof is omitted here.

When the CMNCTN is started at step 77, the communication unit 33 at first executes the self-diagnosis (step 78). If it is judged at step 78 that the communication unit 33 is not normal, a guidance is displayed in the display device 15 (step 79), and the processing operation ends. This guidance is, for example, "Communication unit is abnormal. Call a service station."

At step 78, if it is judged that the communication unit 33 is normal, it is determined whether or not the disk unit 29 is to be used. If a user wants to substitute an updated version of a program of an engine control for an old version thereof, he must use the disk unit 29 to load such a new program, which is supplied by a floppy disk, in a private memory of a microprocessor of the engine control unit 19 through the system manager 1.

For the aforesaid determination, a question and guidance, such as "Use a disk unit ? Input "1", if yes and "2", if no, by a ten-key device.", is displayed in the system display device 15 (step 80). If use of the disk unit 29 is unnecessary, a user inputs "2" (step 81), then the processing operation goes to step 96 (FIG. 4b), which will be referred to later.

If the user selects "1", the program DSK for the disk unit 29 is started (step 82). When the DSK is started, the disk unit 29 executes the self-diagnosis (step 83). If it is judged at step 83 that the disk unit 29 is abnormal, a guidance is displayed in the system display device 15 (step 84). An example of this guidance is "Disk unit is abnormal. Use an internal memory ? Input "1", if yes and "2", if no, by a ten-key device." The internal memory in this guidance means the memory 5 of the system manager 1, and the meaning of the use of the internal memory will be apparent later.

When a user selects "2" at step 85, a guidance, such as "Call a service station", is displayed in the system display device 15 (step 86), and the processing operation ends. Otherwise, the processing operation goes to step 96 (FIG. 4b) through step 87 (FIG. 4b), at which the guidance displayed at step 84 is cleared.

Returning to step 83, if it is judged at this step that the disk unit 29 is normal, a record of the card inserted in the card unit 13 is read (step 88), and the read-out record is displayed in the system display device 15 (step 89).

Figure 4A:
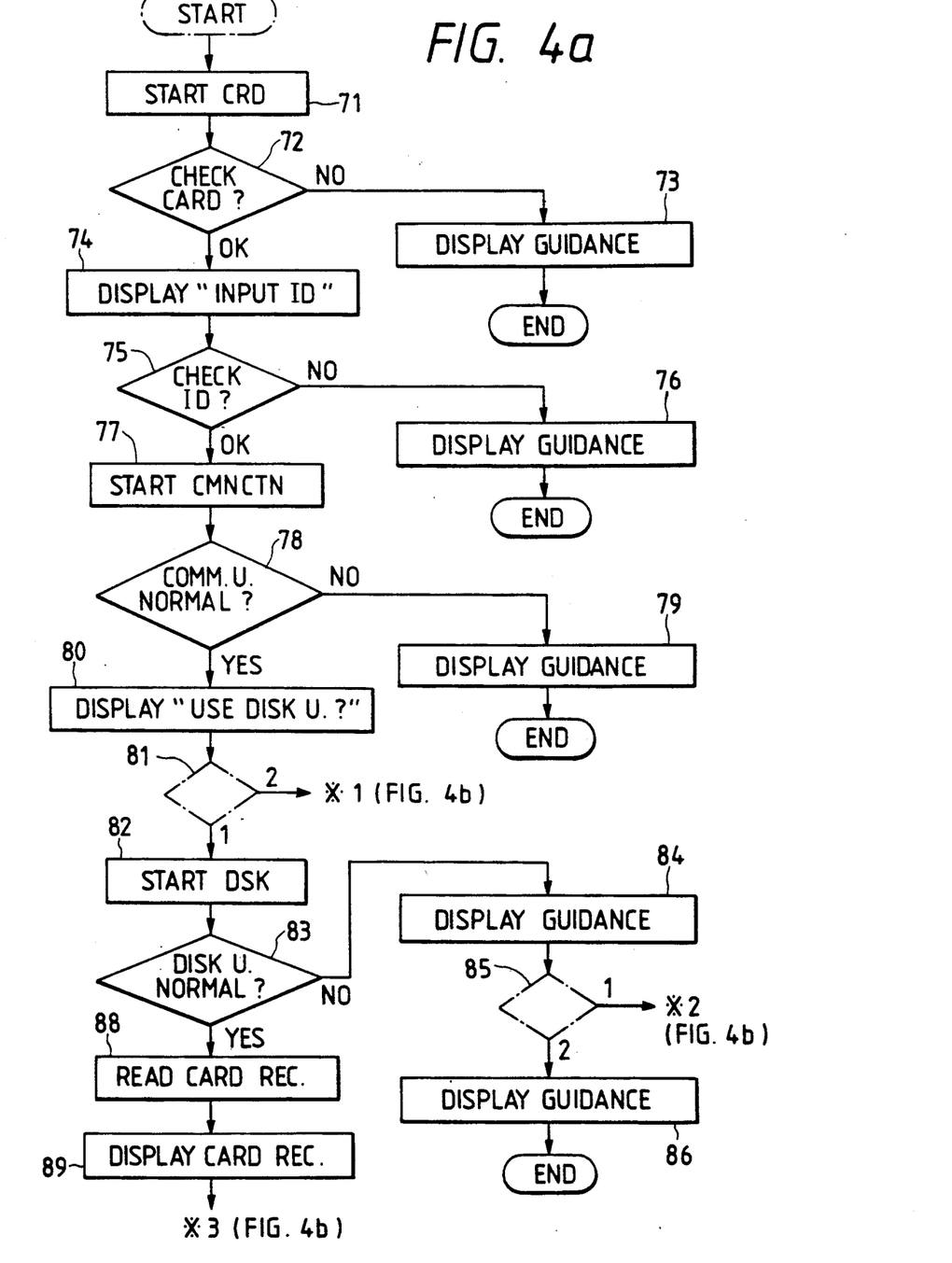
FIGS. 4a and 4b are flow charts illustrating the processing operation executed by the system manager during a set-up operation of the control apparatus of FIG. 1.
Figure 4B:
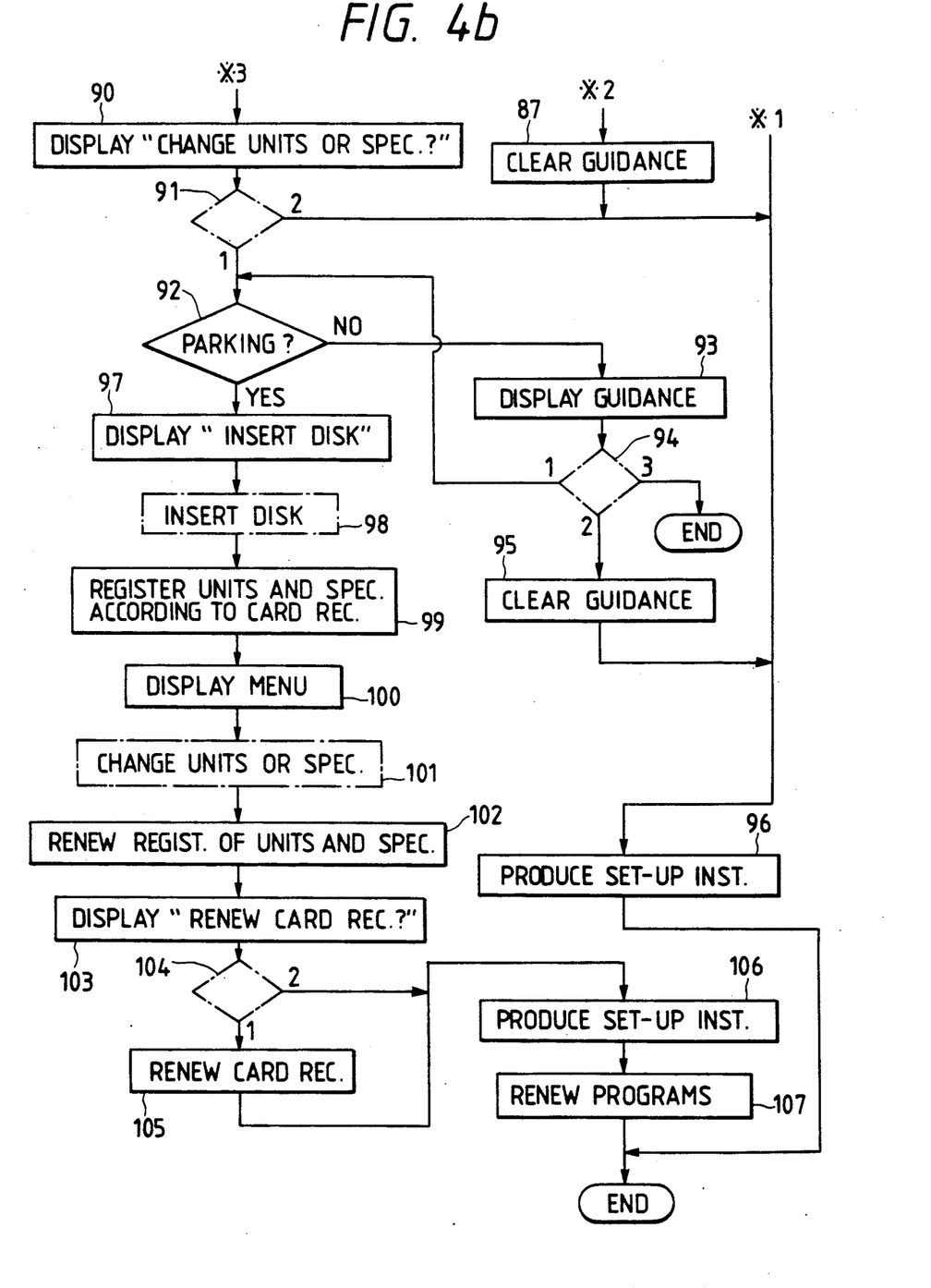

Then, the processing operation goes to steps shown in FIG. 4b. At first, it is discriminated whether or not units to be used or specifications thereof are to be changed. To this end, a guidance, such as "Change units or their specifications ? Input "1", if yes and "2", if no, by a ten-key device.", is displayed in the system display device 15 (step 90).

If a user inputs "2" and he selects no-change in units to be used and/or their specifications, then the processing operation goes to step 96 (FIG. 4b). Otherwise, it is discriminated at step 92 whether or not an automobile is in the condition of parking. This can be discriminated by a signal indicating that a shift lever is set at a parking position or that an engine is idling or stops. If the automobile is not in the condition of parking, the change of units and/or their specifications is not allowed. This is because the sudden change in the drive characteristic during travel of an automobile, for example, may be accompanied by danger.

If the change of the units and/or their specifications is not allowed, a guidance is displayed in the system display device 15 (step 93). An example of this guidance is "Change is not allowed. Bring an automobile into a parking condition or use an internal memory ? Input "1", if an automobile is brought into a parking condition, "2", if you use an internal memory, and "3", if you do not use an internal memory."

If a user selects "1" at step 94, the processing operation returns to step 92, and the processing operation of the loop of steps 92, 93 and 94 is repeated until an automobile is brought into the parking condition. When the user selects "2", the guidance displayed at step 93 is cleared (step 95) and the processing operation goes to step 96. Further, if he selects "3" at step 94, the processing operation ends at once, because the automobile is not in the parking condition and therefore the change of the then used units and/or their specifications is not allowed.

If it is judged at step 92 that an automobile is in the parking condition, a guidance is displayed in the system display device 15 (step 97). An example of this guidance is "Insert a disk". If a disk is inserted in the disk unit 29 (step 98), the registration of the units and their specifications in the area 63 of the memory 5 of the system manager 1 is carried out in accordance with the card record (step 99). Then, a picture of a menu as shown in FIG. 8 is displayed in the system display device 15 (step 100).

A user carries out the change of units to be used and their specifications by manipulating the ten-key device 11 in accordance with the displayed menu (step 101). By way of example, a first item, i.e., "1 ENGINE CONTROL UNIT", is at first highlighted. If the user inputs "1" by the ten-key device 11, this means that the characteristic of the economic drive is selected as a specification for the engine control unit 19. That numerical input data is temporarily stored in an appropriate portion of the memory 5 and the highlight in the menu is shifted to a second item, i.e., "2 POWER STEERING UNIT".

Then, if the user inputs "1" by the ten-key device 11, this means that the characteristic of the normal steering is selected as a specification for the power steering unit 23. That numerical input data is also stored in the appropriate portion of the memory 5 and the highlight is shifted to a next item.

Figure 8:
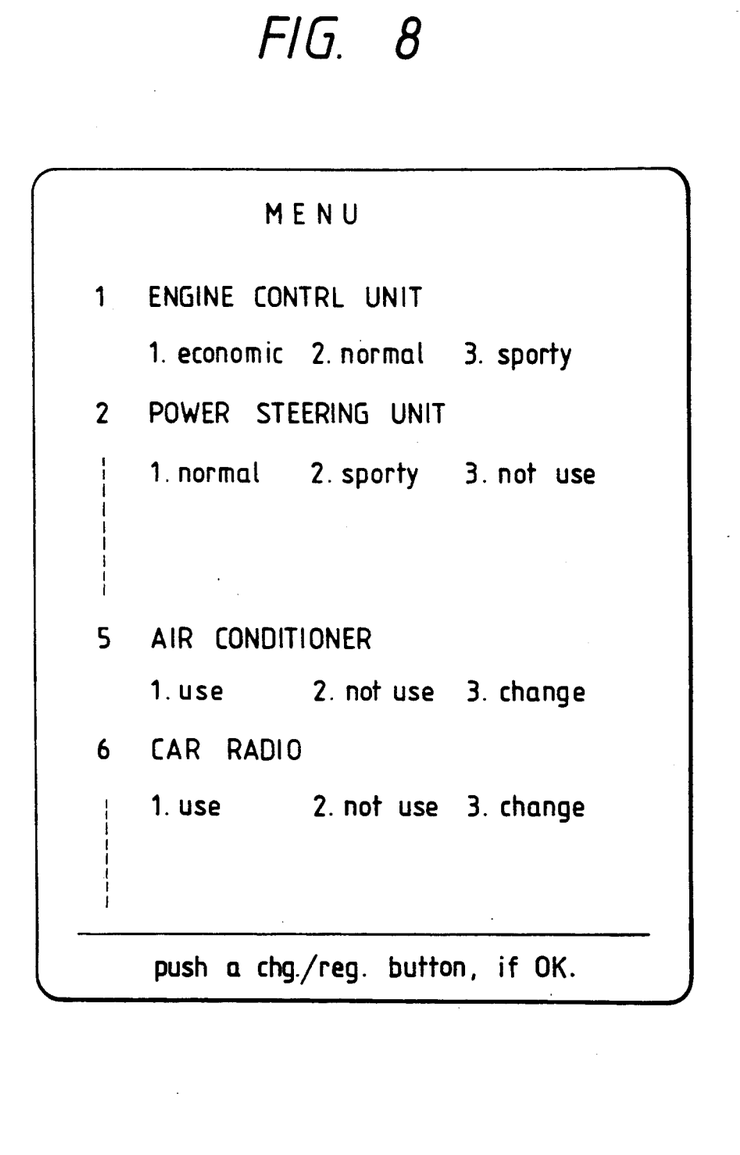
FIG. 8 shows a part of an example of a picture of menu employed during the execution of the processing as shown in FIGS. 4a, 4b and 10.

If, referring to the menu picture, the user repeats the manipulation as mentioned above and completes it with respect to all the items, a guidance, such as "Push a change/register button, if the above is OK." is displayed on a bottom line of the menu picture, as shown in FIG. 8.

Then, if the user pushes the change/register button switch 57 (FIG. 2), the registration of the thus determined units and their specifications is renewed in the area 63 of the memory 5 of the system manager 1 (step 102), and a guidance such as "Renew a card record, too ? Input "1", if yes and "2", if no.", is displayed in the system display device 15 (step 103).

If a user inputs "2" at step 104, the processing operation goes to step 106 without renewing the card record. If he selects "1" at step 104, the processing operation goes to step 106 after the card record is renewed (step 105). The renewal of the card record at this step has the following advantage. When the user is going to use another automobile next time, he can use the other automobile with the same drive characteristic or accessories as selected or prepared this time, if he only inserts the card in the card unit 13 of the other automobile.

At step 106, there is produced a set-up instruction signal, by which the selected units are powered on and programs for those units are renewed in accordance with the specifications set at step 101 (step 107), with the result that those units are brought into the waiting condition from the stoppage condition. Thereafter, the processing operation of FIGS. 4a and 4b ends.

By the way, the set-up instruction signal is also produced at step 96; i.e., when a user selects the use of the internal memory 5 at steps 85 and 94, and when he does not want to change units to be used and their specifications (step 91). In those cases, the system of the control apparatus is made up in accordance with the contents of the previous registration in the area 63 of the memory 5 of the system manager 1.

In the following, the processing operation from start to step 77 in FIG. 4a will be described more in detail, referring to FIG. 5.

After start, the system manager 1 is initialized and the self-diagnosis of the card unit 13 is carried out (step 111). Then, it is checked at step 112 whether or not a card is inserted correctly. If the card is not inserted correctly, a guidance, such as "Insert a card correctly.", is displayed in the system display device 15 (step 113), and the processing operation goes to step 114, at which it is judged whether or not the card is taken out from the card unit 13. The operation of step 114 is repeated, until the incorrectly inserted card is taken out from the card unit 13.

If the incorrectly inserted card is taken out, the processing operation returns to step 112, passing through step 115. This is because step 115 is a step which is executed only when a guidance of "Invalid card" is displayed, as described later. The processing operation as mentioned above is repeated, until the card is inserted correctly.

When the card is correctly set in the card unit 13, it is discriminated at step 116 whether or not the inserted card is a registered one. This is made by comparing a code assigned to the inserted card with the list of codes of registered cards, which is stored in the memory 5. If the card is not registered, the processing operation goes to step 117, at which a guidance "Invalid card" is displayed. After that, the processing operation goes to step 114.

At step 114, the same processing operation as described above is carried out, and if the card is taken out from the card unit 13, the processing operation returns to step 112, after the guidance displayed at step 117 is cleared (step 115). Thereafter, the same processing operation as mentioned above is conducted, and this loop operation continues until the inserted card, which is not registered, is taken out and a registered card is inserted.

If it is judged at step 116 that the inserted card is registered, the processing operation goes to step 118, at which it is discriminated whether or not the card is valid. As will be described later, a flag indicating "invalid" is recorded in a card, in the case where the card is misused, for example. AT this step, therefore, the existence of such a flag is searched. If it is judged at step 118 that the inserted card is invalid, the processing operation goes to step 117 and the same processing operation as already described is carried out.

At step 118, if it is judged that the card is valid, a content of a counter, which is provided in a private memory of a microprocessor of the card unit 13, is initialized at "1" (=n) (step 119) and thereafter a guidance, such as "Input your ID.", is displayed in the system display device 15 (step 120). If a user inputs his ID (step 121), it is checked at step 122 whether or not the inputted ID is correct. As already known, this is done by comparing the inputted ID with an ID recorded on the card in advance.

If the inputted ID is correct, the operation goes to step 77 of the flow chart shown in FIG. 4a. Otherwise, the content n of the counter is compared with a predetermined value N, e.g., "3" (step 123). If n does not exceed N, one is added to n (step 124) and then a guidance of "Retry to input your ID." is displayed in the system display device 15 (step 125). This loop operation is repeated, until a correct ID is inputted.

At step 123 during this loop operation, it is judged that n exceeds N, the processing operation goes to step 126, at which a flag indicating "invalid" is recorded in the card, and the processing operation ends after a guidance is displayed in the system display device 15. An example of this guidance is "Every ID inputted is incorrect. You can no longer start the automobile with this card." With this, a theft of an automobile can be prevented, for example.

Figure 5:
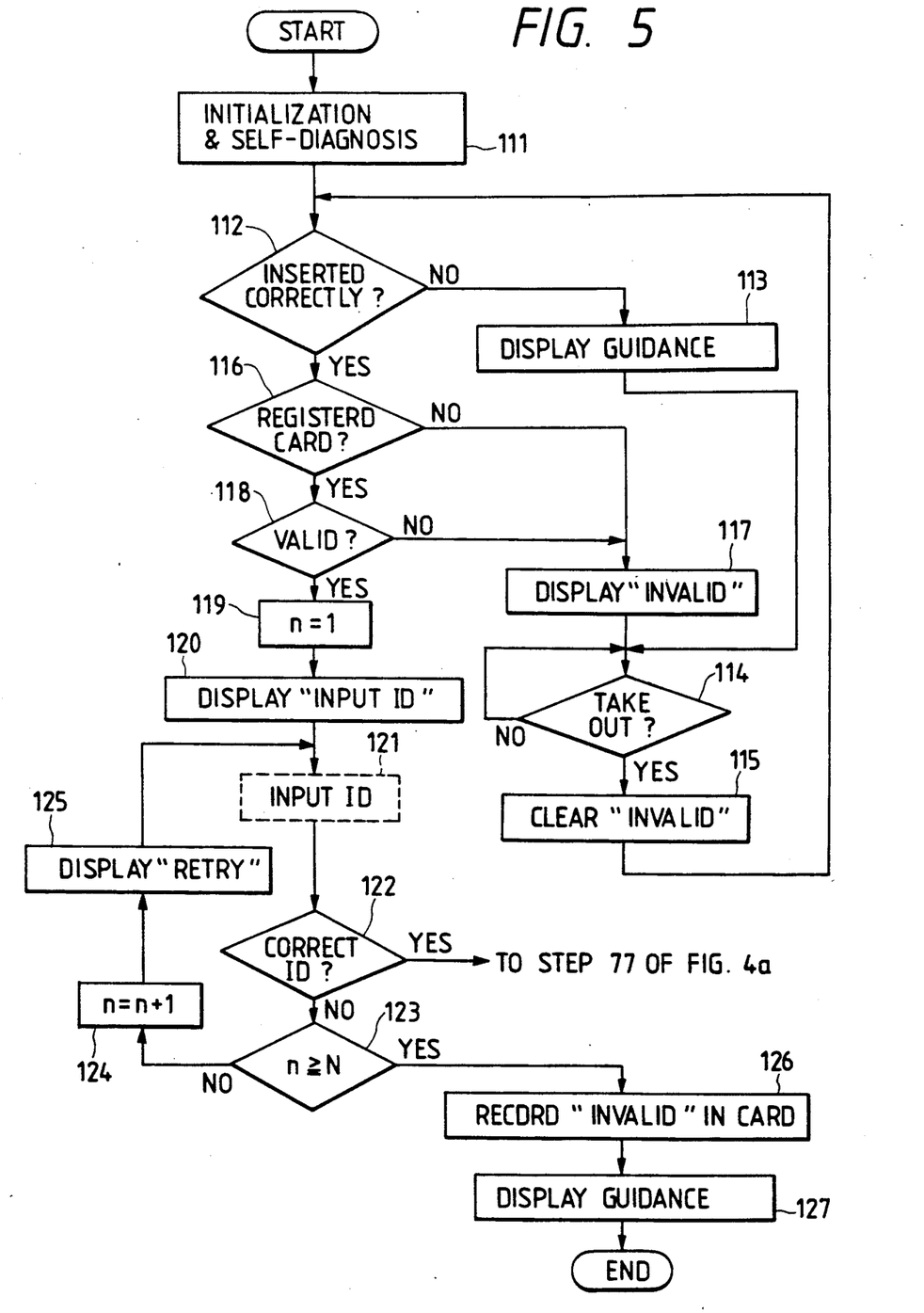
FIG. 5 is a flow chart showing a part of the processing operation of FIG. 4a further in detail.
Figure 6:
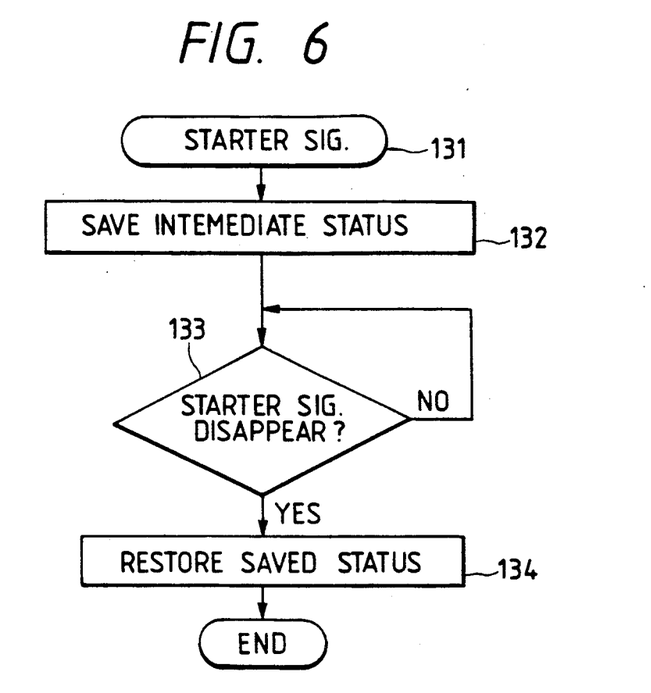
FIGS. 6 and 7 are flow charts of two kinds of interruption processing operations, which are initiated by a user's manipulation or request possibly occurring during the execution of the processing as shown in FIGS. 4a (or FIG. 5) and 4b.

By the way, it can be considered that a user manipulates the starter button 49 during the execution of the processing operation as shown in FIGS. 4a, 4b and 5. As is well known, if a starter motor is actuated, the voltage of a power source considerably decreases, with the result that a malfunction of a microprocessor of every unit will be caused. In this embodiment, therefore, when a starter motor is actuated, an interruption processing operation as shown in FIG. 6 is executed.

When a starter is actuated, there is generated a starter signal, which will be referred to later. The system manager 1 watches the generation of this starter signal at an appropriate time interval, such as 5 msec., and if the starter signal is detected, the interruption processing operation is initiated (step 131).

If the starter signal occurs, the system manager 1 instructs every unit to save an intermediate status of the processing operation thereof in its private memory, and in every unit, the saving operation is carried out (step 132). If the starter signal disappears (step 133), the system manager 1 instructs every unit to restore the intermediate status saved in its private memory, and in every unit, the restoring operation is conducted (step 134). Thereafter, this interruption processing operation ends.

Figure 7:
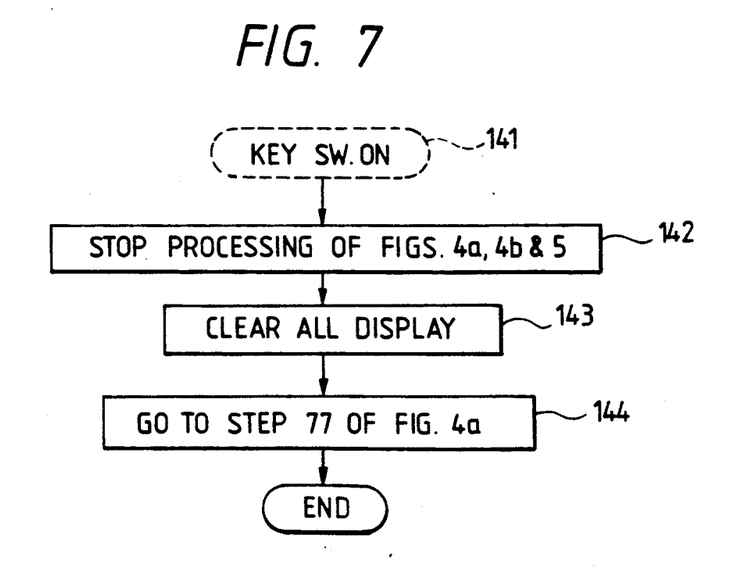

As already described, at steps 73 and 76 of FIG. 4a, a user is alternatively given the guidance ". . . or start with a key". Further, there will be a case where a user must start an automobile with a key for some reasons. In those cases, the processing operation as shown in FIG. 7 is executed.

When a user inserts a key into the key switch 51 and turns it on, a key switch-on signal is generated. The system manager 1 watches the generation of this signal at an appropriate time interval, i.e., 50 msec., and if the generation of the signal is detected, the interruption processing operation is initiated (step 141).

When this signal occurs, the system manager 1 stops the processing operation as shown in FIGS. 4a, 4b and 5 (step 142). Then, all the guidances displayed in the system display device 15 at that time are cleared (step 143). Thereafter, the system manager 1 executes the processing operation after step 77 of FIG. 4a (step 144). Therefore, once the control apparatus is set up by a key, the operation thereafter is the same as that set-up by a card.

Figure 9:
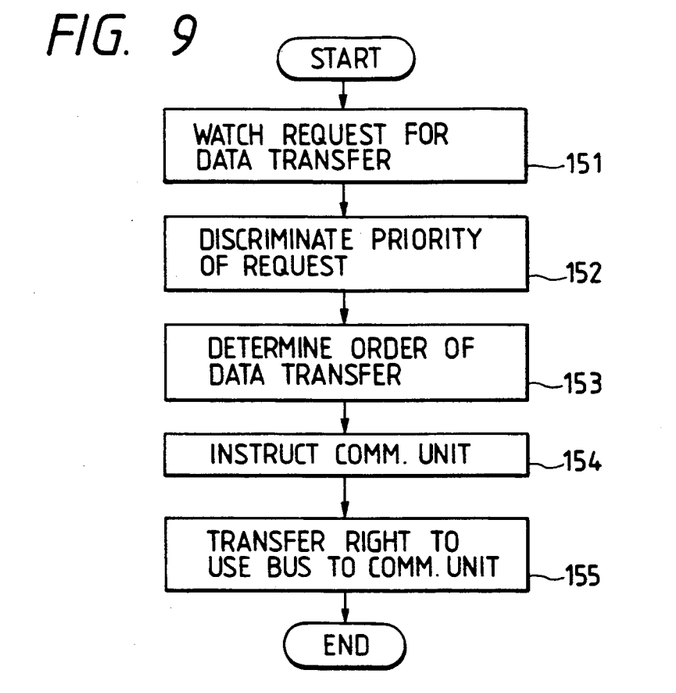
FIGS. 9 and 10 are flow charts illustrating processing operations executed by the system manager after the set-up operation of the control apparatus of FIG. 1.
Figure 10:
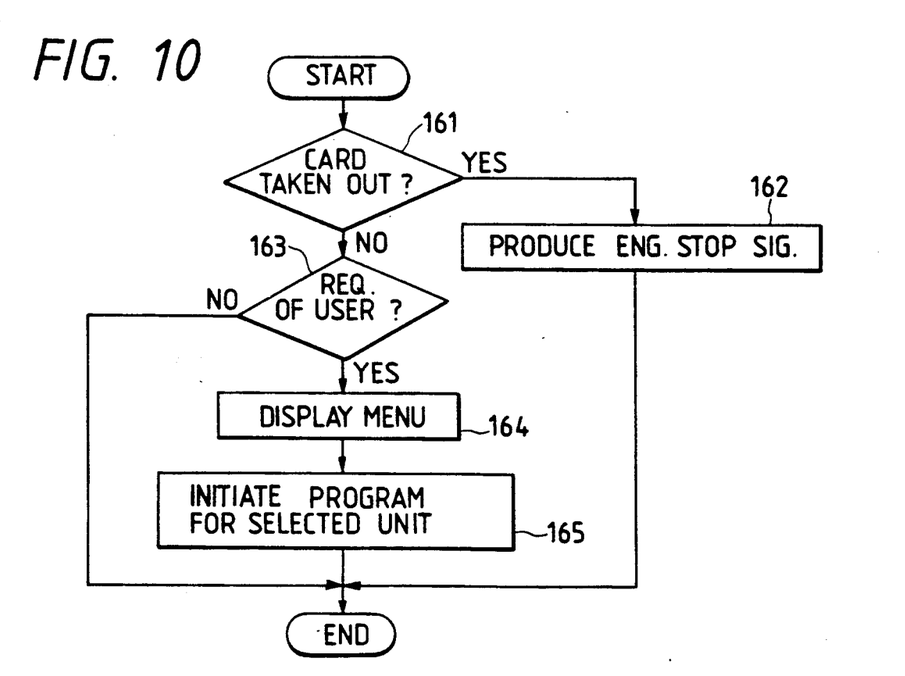

After the control apparatus is set up, the system manager 1 executes tasks as illustrated by flow charts of FIGS. 9 and 10. Both tasks are executed periodically, but in this embodiment, a task shown in FIG. 9 has a higher priority in the execution than that shown in FIG. 10. Therefore, the former task is executed every 5 msec. and the latter task every 50 msec., for example.

The description will be at first made of the task shown by the flow chart of FIG. 9. After start of this task, it is watched at step 151 whether or not any of the units generates a request for data transfer. If such a request is caught, the priority of the request is discriminated at step 152, and then the order of data transfer is determined in accordance with the priority (step 153). The result of the determination in step 153 is transferred to the communication unit 33 (step 154).

Then, the system manager 1 transfers the right to use the bus line 17 to the communication unit 33 (step 155) and the operation of this figure ends. After that, the unit 33 conducts the data transfer between corresponding units, using the bus line 7 and in accordance with the information given from the system manager 1.

Priorities of such requests, i.e., of data transfers, are arbitrarily determined in advance and stored in the memory 5 of the system manager 1. The data transfer between the engine control unit 19 and the transmission control unit 21, for example, will be given the highest rank of the execution priority. Generally, priorities of data transfer between accessory units will be lower.

Next, the processing operation of the task as shown by the flow chart of FIG. 10 will be explained. After start of this task, it is discriminated whether or not a card is taken out from the card unit 13 (step 161). If the card is taken out, this means that a user has an intention to stop the operation of an engine, and therefore an engine stop signal is produced (step 162).

Otherwise, it is discriminated at step 163 whether or not any request of a user occurs. Such a request is produced by a user's manipulation of the change/register button switch 57 (FIG. 2). If there is no request, the processing operation ends. If, however, a user's request is detected, a picture of the menu as shown in FIG. 8 is displayed in the system display device 15 (step 164).

In this case, some of items (units) in the menu picture will be masked, whereby a user can not do any manipulation of units corresponding to the masked items. For those masked items, there will be selected items of such units that the change thereof may cause danger, if they are changed during the travel of an automobile, such as items of the engine control unit and the power steering unit, for example.

By way of example, if, when the menu as shown in FIG. 8 is displayed (although a part of which may be masked), and "5 AIR CONDITIONER" is highlighted, a user selects "3. change", a program for the air conditioner unit 25 is initiated (step 165). Thereafter, the air conditioner unit 25 starts to execute the program, whereby necessary guidances are displayed in the system display device 15 and the user can dialogically achieve the change of the specifications of an air conditioner, such as set values of a room temperature and/or an air quantity of a blower, for example, in accordance with the displayed guidances.

In this manner, by the periodic execution of the task of FIG. 10, a user's request, including the stoppage of the operation of an engine, can be watched every 50 msec.

Referring next to FIGS. 11a to 11d, the explanation will be made of the transfer in the status of operation of the system manager 1 and the respective units, which operate in the manner as described above.

Figure 11A:
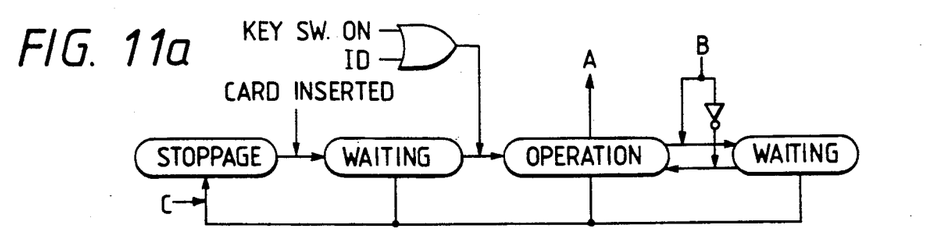
FIGS. 11a–11d are drawings for explaining the status transfer in the operations of the various units included in the control apparatus of FIG. 1.

FIG. 11a shows the status transfer of the operation of the system manager 1, including the card unit 13, the disk unit 29 and the communication 33. Namely, the status transfer of the operation as shown in this figure relates to the units, which operate in accordance with the programs stored in the system management program storing area 61 of the memory 5.

Those units, which are in the status of stoppage, are brought into the status of waiting by inserting a card. If a user inputs his identification ID (cf. step 74 of FIG. 4a) or turns on the key switch 51 (FIG. 2) by using a key (cf. steps 73 and 76 of the same), those units are brought into the status of operation and, after execution of the necessary steps, the set-up instruction signal A is produced (cf. steps 96 and 106 of FIG. 4b).

If the starter signal B is generated during the status of operation of those units, the system manager 1 executes the interruption processing operation as shown in FIG. 6, whereby those units are maintained in the status of waiting, until the signal B disappears. Further, when the stop signal C is generated (cf. step 162 of FIG. 10), those units shift their status to the stoppage from any status thereof.

Figure 11B:
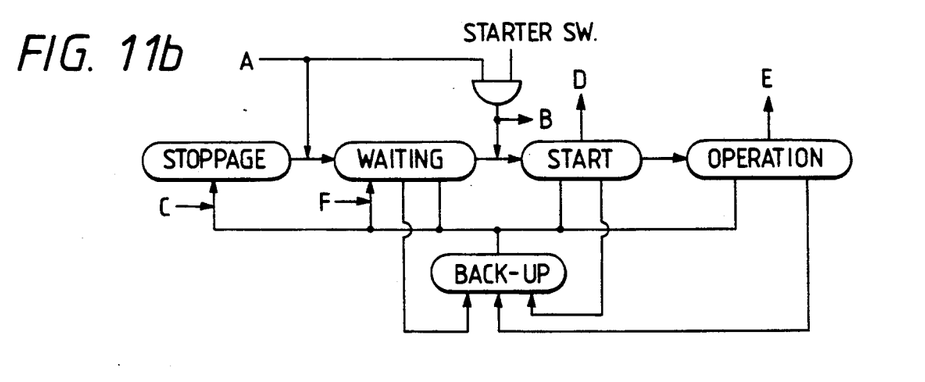

In FIG. 11b, there is shown the status transfer of the operation of the engine control unit 19. This unit 19, which is in the status of stoppage, shifts its status to the waiting status by receiving the set-up instruction signal A produced as described above. Usually, the engine control unit 19 will be subject to the self-diagnosis in this status. If any abnormality is found thereby, this unit 19 is shifted to the status of back-up. Contents of the back-up depends on an engine control unit installed, however they have no direct relation with the present invention.

If a user turns on the starter switch 49 (FIG. 2), the starter signal B is generated and the unit 19 is brought into the status of starting, in which a starter motor rotates and an engine is cranked. During this state, a cranking signal D is generated. When the engine starts as a result of the cranking, the unit 19 is shifted into the status of operation and carries out the known engine control. In this condition, the unit 19 produces a signal E indicating that the engine rotates continuously.

As is well known, the unit 19 is subject to self-diagnosis also during the operation status. If any abnormality is found thereby, the unit 19 is shifted to the condition of back-up. Similarly to the foregoing, contents of the back-up depends on an engine control unit installed. When engine stall occurs and an engine stall signal F is produced, the unit 19, which is in the operation status, is shifted to the waiting status. Further, if the stop signal C is generated, the unit 19 is brought into a stoppage state, even if it is in any other status.

The status transfer in the operation of the transmission control unit 21 and the power steering unit 23 is almost the same as that of the engine control unit 19, as mentioned above.

Figure 11C:
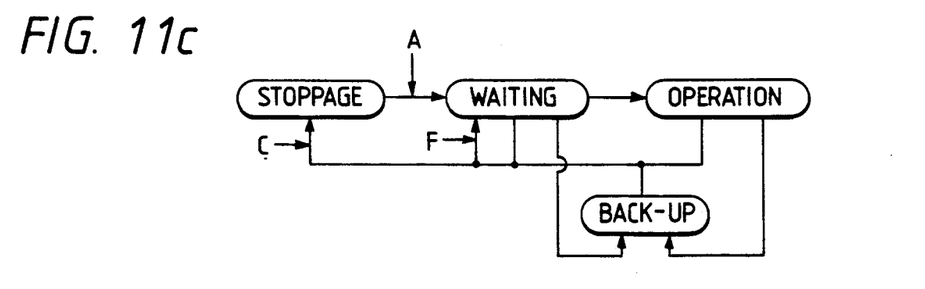

FIG. 11c shows the status transfer of the operation of the display unit 31. Namely, the unit 31, which is in the condition of stoppage, is shifted to the condition of waiting, when the set-up instruction signal A occurs. In this status, the unit 31 is subject to self-diagnosis. If any abnormality is found, the unit 31 is shifted to the condition of back-up. This back-up depends on the display unit being used.

After the completion of the self-diagnosis, the unit 31 is shifted to the status of operation and carries out the predetermined display operation. Also during the status of display operation, the unit 31 is self-diagnosed periodically. If any abnormality is found thereby, the unit 31 is shifted to the back-up condition.

When the engine stall signal F occurs, the unit 31 shifts into the status of waiting, even if it is in any other status. Further, the stop signal C shifts the status of the unit 31 to a stoppage state, even if it is in any other status.

Figure 11D:
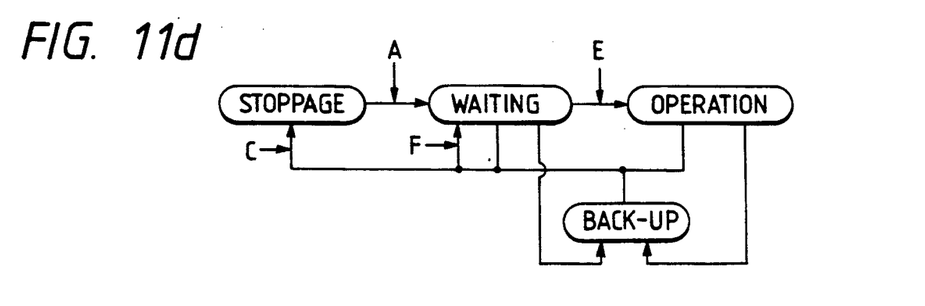

Further, most of the accessory units 35 make almost the same status transfer as shown in FIG. 11c. Although the air conditioner unit 25 belongs to one of the accessory units 35, the status transfer of the operation of the air conditioner unit 25 is shown in FIG. 11d, since it is somewhat different from that of the remaining accessory units 35.

Namely, this unit 25 shifts its condition from the waiting status to the operation status, only when the self-rotation signal E occurs. It will be understood that this means that an air conditioner is operable only when an engine operates steadily.

As described above, according to the present invention, various devices installed in an automobile, such as power train devices and accessories, can be activated or brought into the operable condition by a card, whereby the easy and flexible management of automobiles can be realized especially in the case where plural users use one or more automobiles in common.

In such a card, there is recorded an identification code to identify a user. Also, a card has its own code particularly assigned, and a control apparatus of an automobile has a list of codes of cards acceptable, which are registered in advance. With those two measures, an automobile or automobiles can be prevented from theft or misuse.

The present invention has a further advantage in such a control apparatus for an automobile that is provided with a system manager, which manages and controls the operation of control units for the various devices and accessories, and can select some necessary ones from among the control units and their specifications. In this case, once a user selects control units to be used and their specifications and records them on his card, he can always enjoy the same drive characteristic or accessories only by using his card, even when he uses another automobile.

We claim:

1. A control apparatus for an automobile, comprising:
    a plurality of operating units each for controlling respective ones of various kinds of automobile control devices and other automobile accessories installed in an automobile, each of said devices and accessories being designed to achieve its own particular function under control of its operating unit or in response to a signal from another operating unit or units;
    an information read/write unit for reading/writing a recording medium on which at least information for identifying a valid user of the automobile is recorded; and
    a system manager, including a processing unit and a memory coupled with said operating units and said information read/write unit, which identifies a valid user on the basis of the information recorded on the recording medium and brings ones of said operating units for the various kinds of devices and accessories, which are selected in accordance with the result of the user identification, into an operable condition, thereby enabling such functions and characteristics of the automobile as the user desires.

2. A control apparatus according to claim 1, wherein the information recorded in a recording medium includes a code particularly assigned to the recording medium and a list of codes of recording media registered in advance is provided, and wherein when a recording medium is inserted in the information read/write unit, said system manager refers to the code list to judge whether or not the recording medium inserted is a registered one and initiates operations of said controlling units, only if the recording medium is judges to be registered.

3. A control apparatus according to claim 2, wherein said system manager is further provided with means capable of inputting at least code data and the information recorded in a recording medium includes an identification code which is assigned to an individual user using the recording medium, and wherein said system manager initiates operations of said controlling units only if a recording medium inserted is judges to be registered and an identification code inputted by a user is coincident with the identification code recorded in a recording medium inserted in the information read/write unit.

4. A control apparatus according to claim 1, wherein said system manager is provided with means capable of inputting at least code data and the information recorded in a recording medium includes an identification code which is assigned to an individual user using the recording medium, and wherein said system manager initiates operations of said controlling units if an identification code inputted by a user is coincident with the identification code recorded in a recording medium inserted in the information read/write unit.

5. A control apparatus according to claim 4, wherein when a user inserts a recording medium in the information read/write unit and can not input a correct identification code within a predetermined number of times of trying to input the identification code, a code or flag indicating an invalid card is recorded in the recording medium, whereby said system manager can no longer be operated with the recording medium.

6. A control apparatus according to claim 1, wherein a user can select some of said controlling units, which are desired to be used by the user's own manipulation in accordance with guidance displayed on a display device by said system manager, and wherein the thus selected controlling units are registered in the memory of said system manager in order to make those control units operable and are recorded by the information read/write unit in the recording medium.

7. A control apparatus according to claim 6, wherein when the user selects the controlling units to be used, the specifications of the selected controlling units can be determined, which are recorded by the information read/write unit in the recording medium together with the selected controlling units.

8. A control apparatus according to claim 7, wherein the registration and change of said controlling units to be used and their specifications are allowed only during a certain condition of the automobile.

9. A control apparatus according to claim 8, wherein the registration and change said controlling units and their specifications, which directly relates to the travel of the automobile, including an engine control unit, a transmission control unit and a power steering unit, is not allowed when the automobile travels.

10. A control apparatus according to claim 9, wherein when the automobile travels, part of the guidances displayed on the display device, which concerns the change of the units and their specifications directly relating to the travel of the automobile, is masked.

11. A control apparatus according to claim 6, wherein the controlling units installed in the automobile includes a disk unit, in which a floppy disk can be inserted, and, when the disk unit is registered in the system manager, the alteration of programs for the devices and accessories can be carried out by the floppy disk.

12. A control apparatus for a vehicle by an internal combustion engine, comprising:
    an engine control unit for controlling operation of said internal combustion engine, including at least one of ignition control and fuel injection control, in accordance with a stored program and based upon at least one engine control parameter;
    an information input device through which information may be input by an operator of the vehicle; and
    a system manager, including a processing unit and a memory, coupled to said engine control unit and said information input device for supplying to said engine control unit an engine control parameter inputted through said information input device by an operator, so as to control at least one of ignition timing and fuel injection in said internal combustion engine in accordance with a characteristic based on said engine control parameter selected by the operator.

13. A control apparatus according to claim 12, wherein said information input device is a unit for reading information stored on a portable storage device.

14. A control apparatus according to claim 12, wherein said information input device is a magnetic card reader.

15. A control apparatus according to claim 12, further including a disk unit, in which a storage disk can be inserted by an operator, for selectively inputting a stored unit, said system manager including means for transferring said stored program read form said storage disk to said engine control unit to effect control thereof.

16. A control apparatus according to claim 12, wherein said information input device is a key operated input device.

17. A control apparatus for a vehicle having an automatic transmission, comprising:
   an automatic transmission control unit for controlling said automatic transmission to shift through plural gear ratios at plural shift points in vehicle speed according to at least one shift point parameter;
   an information input device through which information may be input by an operator of the vehicle; and
   a system manager, including a processing unit and a memory, coupled to said automated transmission control unit and said information input device, for supplying to said automatic transmission control unit a shift point parameter inputted through said information input device by an operator, so as to selectively establish an automatic transmission operating characteristic in accordance with the shift point parameter selected by the operator.

18. A control apparatus according to claim 17, wherein said information input device is a unit for reading information stored on a portable storage device.

19. A control apparatus according to claim 17, wherein said information input device is a magnetic card reader.

20. A control apparatus according to claim 17, wherein said information input device is a key operated input device.

21. A control apparatus for a vehicle having a power steering system for generating in the steering of the vehicle, comprising:
   a power steering control unit for controlling said power steering system in accordance with a characteristic based on a steering constant;
   an information input device through which information may be input ba an operator of the vehicle; and
   a system manager, including a processing unit and a memory, coupled to said power steering control unit and said information input device, for supplying to said power steering control unit a steering constant input by an operator of the vehicle through said information input device, so as to selectively establish the characteristic of said power steering system in accordance with the steering constant selected by the operator.

22. A control apparatus according to claim 21, wherein said information input device is a unit for reading information stored on a portable storage device.

23. A control apparatus according to claim 21, wherein said information input device is a magnetic card reader.

24. A control apparatus according to claim 21, wherein said information input device is a key operated input device.

* * * * *